(12) United States Patent
Li et al.

(10) Patent No.: US 6,171,724 B1
(45) Date of Patent: Jan. 9, 2001

(54) BATTERY ELECTRODES, BATTERIES, AND METHODS OF FORMING BATTERIES AND BATTERY ELECTRODES

(75) Inventors: Weihong Li, North Ridgeville, OH (US); Eric R. Dix; Janine M. Rush-Byers, both of Boise, ID (US)

(73) Assignee: Micron Technology, Inc., Boise, ID (US)

( * ) Notice: Under 35 U.S.C. 154(b), the term of this patent shall be extended for 0 days.

(21) Appl. No.: 09/146,114

(22) Filed: Sep. 2, 1998

(51) Int. Cl.[7] .............................. H01M 4/62; H01M 6/00
(52) U.S. Cl. ..................... 429/217; 429/224; 429/231.7; 429/231.8; 429/218.1; 29/623.1
(58) Field of Search .................................. 429/217, 224, 429/231.7, 231.8

(56) References Cited

U.S. PATENT DOCUMENTS

| | | | |
|---|---|---|---|
| 4,565,751 | * | 1/1986 | Faust et al. .............................. 429/94 |
| 5,246,796 | * | 9/1993 | Nagamine et al. ................... 429/194 |
| 5,753,387 | * | 5/1998 | Takami et al. ........................ 429/194 |
| 5,824,120 | * | 10/1998 | Mitchell et al. ..................... 29/623.1 |

* cited by examiner

Primary Examiner—Stephen Kalafut
Assistant Examiner—Angela J. Martin
(74) Attorney, Agent, or Firm—Wells, St. John, Roberts, Gregory & Matkin

(57) ABSTRACT

The invention encompasses batteries, battery electrodes and methods of forming batteries and battery electrodes. In one aspect, the invention includes a method of forming a battery electrode comprising: a) forming an electrode material mixture, the electrode material mixture comprising electrode active material, a conductive medium, and EPM; and b) curing the electrode material mixture to form an electrode having a thickness of less than 24 mils. In another aspect, the invention includes a battery comprising: a) a first electrode comprising: i) a thickness of less than 24 mils; ii) electrode active material; iii) a conductive medium; and iv) a binder comprising EPM; b) a second electrode; and c) an electrolyte between the first and second electrodes. In yet another aspect, the invention encompasses a battery electrode comprising EPM and a thickness of greater than 0 and less than 24 mils.

21 Claims, 4 Drawing Sheets

A) MIX POLYMERIC BINDER MATERIALS WITH AN ORGANIC SOLVENT, THE POLYMERIC BINDER MATERIALS COMPRISING EPM.

B) COMBINE POLYMERIC BINDER MATERIALS MIXTURE WITH ELECTRODE ACTIVE MATERIAL TO FORM ELECTRODE MATERIAL MIXTURE.

C) FORM ELECTRODE MATERIAL MIXTURE INTO A THIN FILM OF COMPRESSIBLE MATERIAL.

D) DRY THIN FILM TO FORM A CATHODE MATERIAL SHEET.

E) PUNCH CATHODE DISCS FROM CATHODE MATERIAL SHEET.

F) COMPRESS CATHODE DISCS TO FORM CATHODES.

FIG. 2

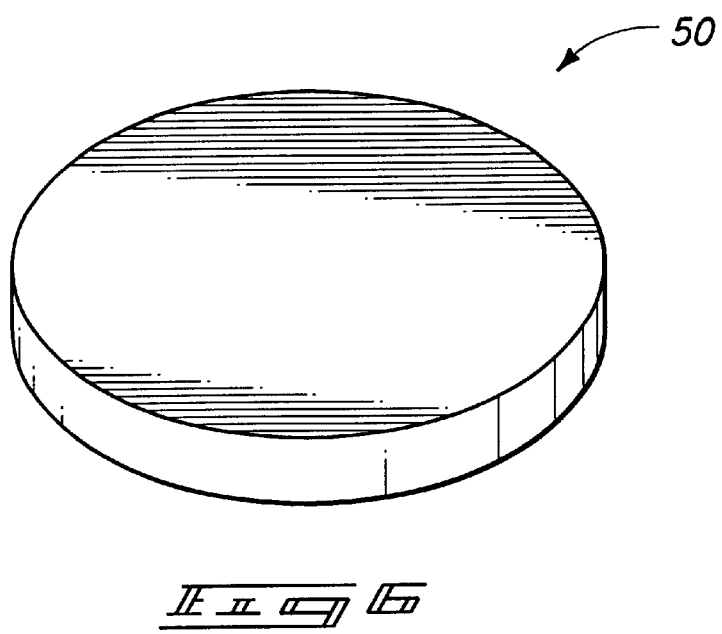
_Fig 6_
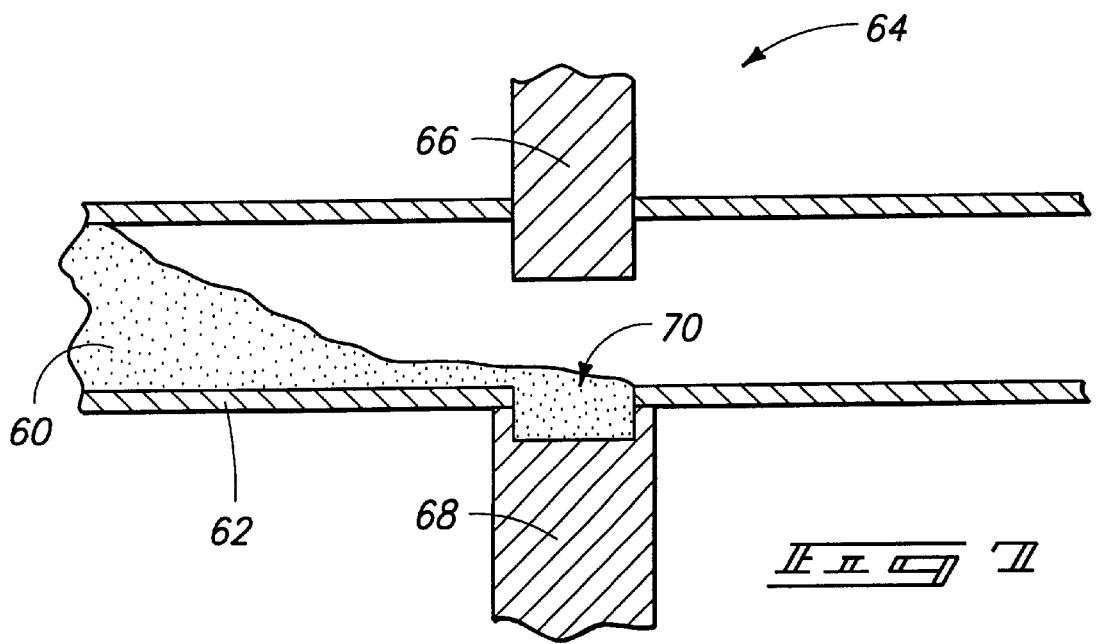
_Fig 7_

BATTERY ELECTRODES, BATTERIES, AND METHODS OF FORMING BATTERIES AND BATTERY ELECTRODES

TECHNICAL FIELD

The invention pertains to batteries, battery electrodes and methods of forming batteries and battery electrodes. The invention has particular application to methods of forming very thin batteries, such as button-type batteries.

BACKGROUND OF THE INVENTION

Small, thin batteries, such as button-type batteries, are commonly used in modern devices. For instance, button-type batteries are utilized as power sources for calculators and watches.

A prior art button-type battery 10 is shown in FIG. 1. Battery 10 comprises a lower terminal housing member, or can 12, and an upper terminal housing member, or lid 14. Can 12 and lid 14 are sealingly joined together at a crimp 16. Battery 10 is typically in the shape of a circle, with crimp 16 extending entirely around a periphery of the circle. A gasket material 18 is provided within crimp 16 to form a fluid-tight seal within the crimp. A cathode 20 and an anode 22 are provided between terminal housing members 12 and 14. Cathode 20 has a thickness of greater than 13 mils, and is generally not durable unless it has a thickness of greater than 24 mils. Cathode 20 and anode 22 are separated by a porous separator 24. An electrolyte 26 is provided within the battery and within porous separator 24.

Battery cathode 20 typically comprises a mixture of an active material and a conductive medium, or diluent. The active material can be, for example at least one of manganese dioxide and $(CF)_x$. The manganese dioxide provides a source of oxidizing component in a battery cell. As manganese dioxide is itself a poor conductor, the conductive medium is added to provide electrical conductivity. The conductive medium can be, for example, elemental carbon. The elemental carbon is typically in the form of graphite, although other materials, such as, acetylene black can also be used. Natural graphites can be used in alkaline cells, but typically cells are made with very pure synthetic graphite to reduce impurities which might lead to corrosion in a battery cell.

A difficulty in forming battery cathodes occurs in binding a conductive medium with an active material. A goal is to develop binders which produce dense, stable cathodes having good electronic and ionic conductivity, and efficient discharge even at high discharge rates. Another goal is to develop binders which form cathodes which can be very thin, and yet durable enough to be utilized with pick and place automation. Also, a goal is to develop binders which are simple to incorporate into manufacturing processes by which battery cathodes are produced. It would be desirable to develop methods of forming battery cathodes which achieve one or more of the above-discussed goals.

There is a continuing goal in small battery fabrication to form the batteries increasingly thinner, while maintaining efficient power discharge and physical durability. Limitations in battery thickness are imposed by limitations of the thicknesses of battery components, such as the anode and the cathode. Accordingly, it would be desirable to develop methods for forming thinner battery components which have good physical durability and efficient power discharge.

SUMMARY OF THE INVENTION

The invention encompasses batteries, battery electrodes and methods of forming batteries and battery electrodes.

In one aspect, the invention includes a battery electrode comprising EPM and a thickness of greater than 0 and less than 24 mils.

In another aspect, the invention includes a battery comprising a first electrode. The first electrode includes a thickness of less than 24 mils, an electrode active material, a conductive medium, and a binder comprising EPM. The battery also includes a second electrode and an electrolyte between the first and second electrodes.

In yet another aspect, the invention includes a method of forming a battery electrode. An electrode material mixture is formed. The electrode material mixture comprises electrode active material, a conductive medium, and EPM. The electrode material mixture is cured to form an electrode having a thickness of less than 24 mils.

BRIEF DESCRIPTION OF THE DRAWINGS

Preferred embodiments of the invention are described below with reference to the following accompanying drawings.

FIG. 2 is a flow chart of a process for forming a battery cathode according to the present invention.

FIG. 6 is a perspective view of the cathode material of FIG. 3 at a processing step subsequent to that of FIG. 5.

FIG. 7 is a diagrammatic cross-sectional view of a cathode material being processed according to a second embodiment process of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention encompasses methods of forming thin cathodes for thin profile batteries. A first embodiment method of the present invention is described in a flow chart of FIG. 2, as well as with the diagrams of FIGS. 3–6. The method utilizes polymeric binder materials comprising EPM (wherein EPM refers to copolymers of ethylene and propylene monomers), as a binding agent in a cathode to, for example, bind carbon and $MnO_2$. EPM is preferably fully saturated (e.g., does not contain any diene units) so that the EPM has better resistance to radiation, heat and oxidation than would a partially unsaturated polymer. EPM can comprise polymers formed from monomers selected from the group consisting of ethylene and propylene. Alternatively, EPM can comprise polymers formed from ethylene and propylene in combination with other monomers. For example, EPM can comprise EPDM which is a terpolymer comprising the three monomers ethylene, propylene, and a non-conjugated diene.

Referring to FIG. 2, a first step in the process (step "A") is to mix the polymeric binder materials with an organic solvent to form a mixture. The organic solvent can comprise any solvent capable of dissolving the polymeric binder materials, such as, for example, acetone, methyl ethyl ketone, tetrahydrofuran (THF), or N-methyl pyrrolidone. The solvent can also be a blend of, for example, THF and N-methyl pyrrolidone. preferably, from about 35% to about 45% (by weight) of the polymeric binder materials is provided in the solvent at room temperature and room pressure to achieve dissolving.

In step "B", the polymeric binder material mixture is combined with electrode active materials and a conductive medium to form an electrode material mixture. Examples of electrode active materials are $MnO_2$ and $(CF)_x$. An example conductive medium is elemental carbon.

Figure 3:
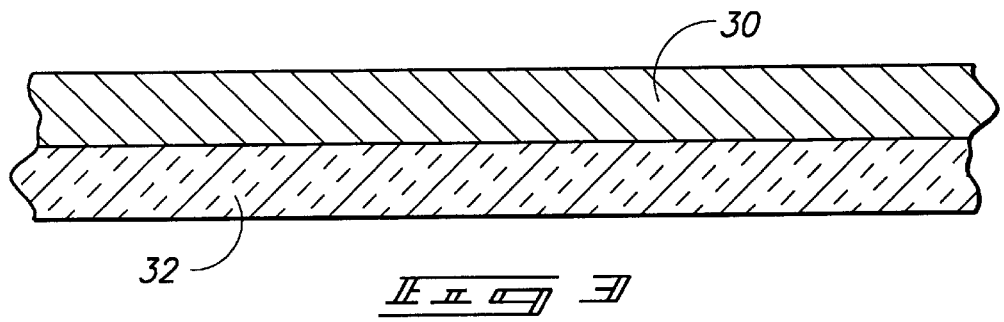
FIG. 3 is a diagrammatic cross-sectional view of a cathode material being processed according to a first embodiment process of the present invention.

In step "C", the electrode material mixture is formed into a thin film of compressible material. Methods for forming the electrode material mixture into a thin film of compressible material include, for example, solvent casting, extrusion, or drying into a powder. FIG. 3 is a diagrammatic view of a thin compressible film 30 formed by solvent casting or extrusion over a removable substrate 32. Substrate 32 can comprise, for example, a polyester film. If thin film 30 is formed by solvent casting, the electrode material mixture can be applied to substrate 32 as a low viscosity liquid and then dried to remove organic solvents from the film and form the compressible material 30. Thin film 30 is preferably about 0.04 inches thick when it is initially cast as a wet film. The film is then dried at, for example, 80° C. for about 30 minutes to remove organic solvent from the film and to decrease the thickness to a thickness of from greater than 0 mils to less than 24 mils, more preferably to from greater than 0 mils to less than about 20 mils, and even more preferably to from greater than 0 mils to less than about 12 mils. The drying of thin film 30 is indicated as step "D" of FIG. 2.

If thin film 30 is formed by extrusion, the electrode material mixture can be passed through an extruder in a relatively high viscosity form to form the resultant thin film 30. A thin film 30 formed by an extrusion process can be placed on a removable substrate 32 as shown, or it can be fed directly to a pellet punch (described below with reference to FIG. 5).

Appropriate viscosities of an electrode material mixture for utilization in solvent casting processes or extrusion processes are known to persons of ordinary skill in the art.

Figure 4:
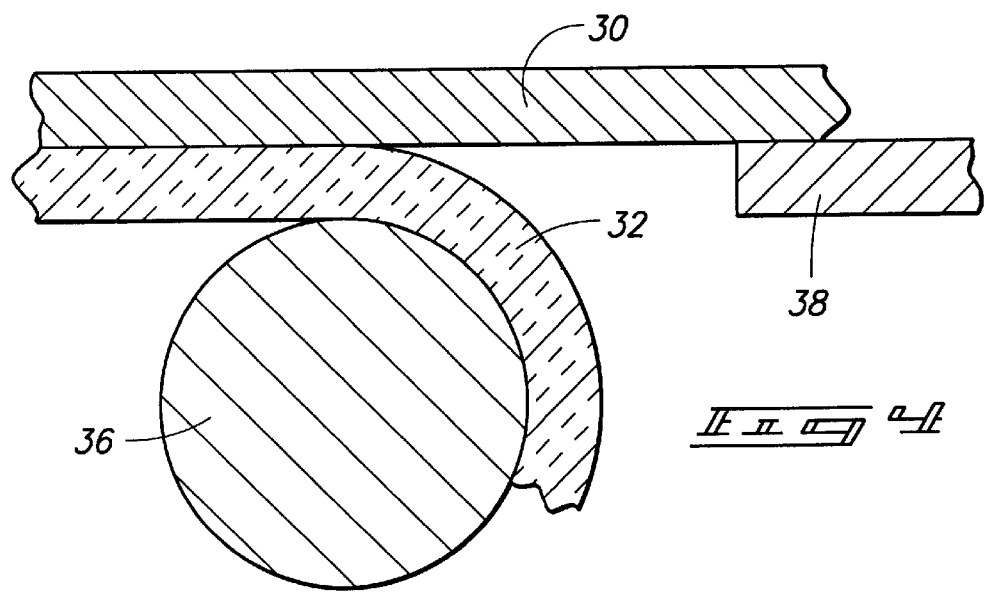
FIG. 4 is a diagrammatic cross-sectional view of the cathode material of FIG. 3 at a processing step subsequent to that of FIG. 3.

Referring to FIG. 4, removable substrate 32 is separated from thin film 30 to release the thin film as a cathode material sheet. Methods for separating removable substrate 32 from thin film 30 are known to persons of ordinary skill in the art. Such methods can include adhering removable substrate 32 to a roller device 36 and pushing thin film 30 onto a support structure 38.

Figure 1:
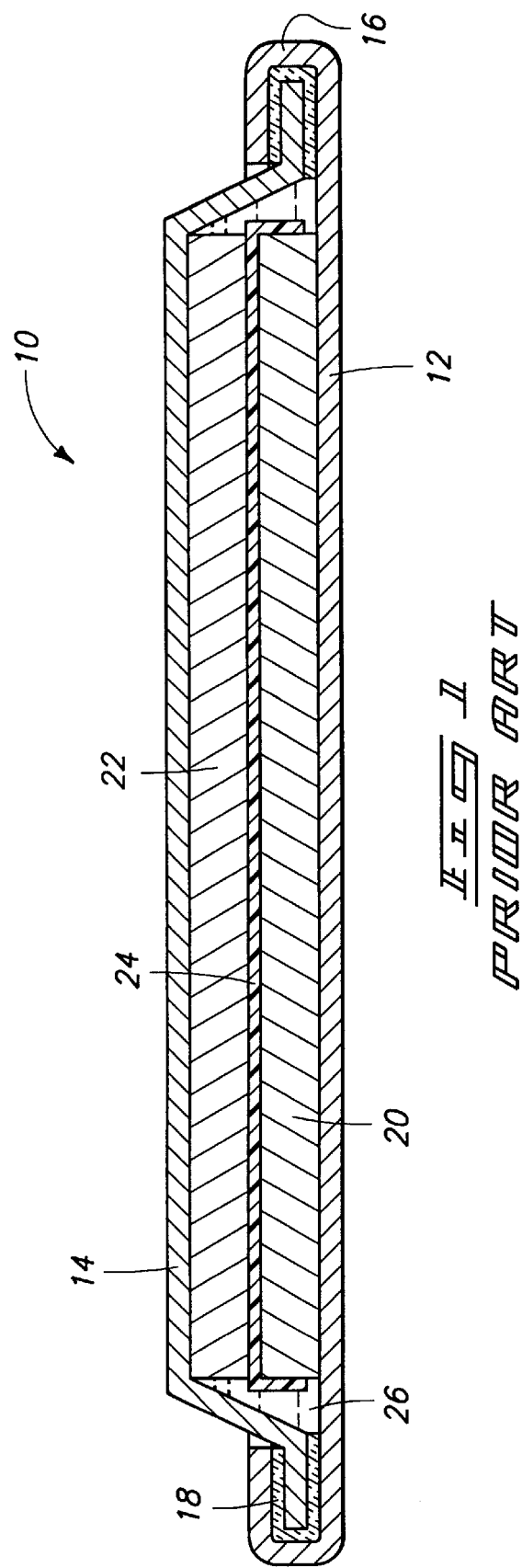
FIG. 1 is a diagrammatic cross-sectional view of a prior art button-type battery.
Figure 5:
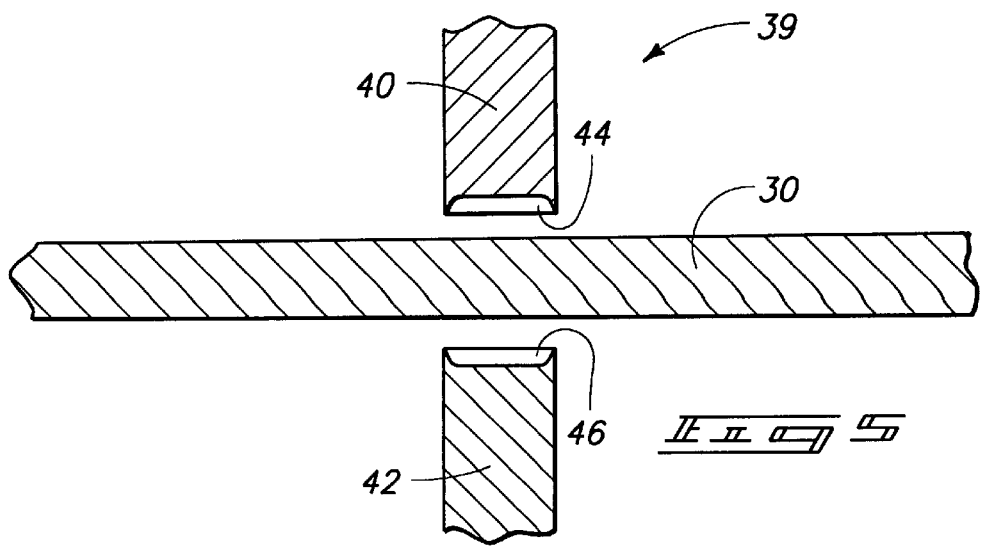
FIG. 5 is a diagrammatic cross-sectional view of the cathode material of FIG. 3 at a processing step subsequent to that of FIG. 4.

Referring to steps "E" and "F" of FIG. 2, a cathode disk is punched from the cathode material sheet, and compressed to form a cathode. In a preferred embodiment of the present invention, the punching and compressing occur in a common step as shown in FIG. 5. Thin film sheet 30 is placed within a punch 39 comprising a pair of spaced punch dies 40 and 42. Punched dies 40 and 42 are preferably circular in horizontal cross-sectional shape (not shown), and preferably comprise recesses 44 and 46, which are less than about 4 mils deep. Dies 40 and 42 are forced together to compress sheet 30 between them and to punch a cathode disk 50 (shown in FIG. 6) from sheet 30. Referring to FIG. 6, cathode disk 50 is preferably circular in shape, and preferably comprises a thickness of less than 24 mils, more preferably of less than about 20 mils, and more preferably of less than about 12 mils. Cathode disk 50 is thus very thin. Cathode disk 50 is also durable enough to be utilized with pick and place automation. Cathode disk 50 may be incorporated into a button-type battery (such as the battery shown in FIG. 1) as an operable cathode. Once incorporated into a battery, cathode disk 50 is found to have efficient discharge properties. For example, a cathode disk of the present invention will have a discharge rate of about 2 milliamps/$cm^2$.

Although the above-discussed process removed substrate 32 from thin film 30 prior to subjecting thin film 30 to punch 39, alternative processes can be used in which substrate 32 is not removed until after punching a cathode disk from material 30. In such alternative processes, the recesses formed in punch dies 40 and 42 can be deeper than 4 mils to accommodate the extra thickness of substrate 32.

Also, in alternative methods of the invention, the cutting of a cathode disk can occur before, or after, compressing cathode material 30. Methods for cutting cathode material 30 before or after compressing material 30 will be recognized by persons of ordinary skill in the art.

An alternative method of the present invention is described in reference to FIG. 7. In FIG. 7, a cathode powder material 60 is provided onto a conveyor sheet 62 which conveys the material to a press 64. Powder 60 can be formed from the above-discussed electrode mixture of polymeric binder materials, $MnO_2$, and elemental carbon by drying the mixture and subsequently pulverizing or grinding the mixture into a powder. Press 64 comprises a die 66 and a die receptacle 68. Die receptacle 68 comprises an orifice 70 configured for receiving die 66. Die 66 and orifice 70 preferably have a circular cross-sectional shape along a horizontal cross-section (not shown).

A squeegee type apparatus (not shown) can be utilized to sweep the powder across and within orifice 70 to fill orifice 70 with powder 60. The powder within orifice 70 is then compressed by die 66 to form a cathode disk having dimensions preferably identical to the preferable dimensions discussed above regarding disk 50 of FIG. 6. After the cathode disk is formed within orifice 70, the disk can be removed by methods known to persons of ordinary skill in the art. Such methods can include sliding a punch (not shown) into the bottom of orifice 70 to expel the cathode disk from the orifice. It is noted that orifice 70 will have a depth slightly greater than a final thickness of a cathode disk formed within orifice 70. For instance, if a cathode disk is to be formed to a thickness of less than about 20 mils, orifice 70 will have a depth slightly greater than about 20 mils. It is found that the utilization of EPM in accordance with the present invention can improve processes of filling an orifice 70 having a depth of less than or equal to about 20 mils with powder 60. Specifically, it is found that if a polymer binder material other than EPM is used within powder 60, the powder will comprise polymer filaments that can stick to the above-described squeegee apparatus and result in powder being pulled out of orifice 70 as the squeegee apparatus sweeps across orifice 70. Such problem is alleviated when polymer binder materials comprising EPM are utilized, and can be eliminated with polymer binder materials consisting essentially of EPM.

An example composition of a cathode of the present invention is as follows.

EXAMPLE

| Component | Range |
|---|---|
| Manganese Dioxide | 80–92% |
| Carbon | 6–10% |
| EPM | 2–10% |

Although the invention has been discussed primarily with reference to applications in which cathodes are formed, the invention also encompasses methods of forming other battery components, such as anodes. For instance, in applications in which anodes are formed from mixtures of materials, the mixtures can be bound together in accordance with the present invention with a polymeric binder comprising EPM.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a battery electrode comprising:
   forming a liquid electrode material mixture, the electrode material mixture comprising electrode active material, a conductive medium, and copolymers of ethylene and propylene monomers as a binder material;
   forming the liquid electrode mixture into a layer;
   solidifying the liquid electrode mixture;
   forming a powder from the solidified electrode mixture; and
   compressing the powder into a pellet to form an electrode having a thickness of less than 24 mils.

2. The method of claim 1 wherein the electrode comprises a button-type cathode disk.

3. The method of claim 1 wherein the electrode comprises from about 2% to about 10% (by weight) copolymers of ethylene and propylene monomers.

4. The method of claim 1 wherein the binder material further comprises a non-conjugated diene to form a terpolymer.

5. The method of claim 1 wherein the battery electrode thickness is less than about 20 mils.

6. The method of claim 1 wherein the battery electrode thickness is less than about 12 mils.

7. The method of claim 1 wherein the electrode is a cathode, wherein the electrode active material comprises $MnO_2$ and the conductive medium comprises elemental carbon; and wherein the forming the electrode material mixture comprises:
   dissolving the binder material with an organic solvent to form a solution; and
   adding $MnO_2$ and elemental carbon to the solution.

8. The method of claim 7 wherein the organic solvent comprises methyl ethyl ketone, N-methyl pyrrolidone, or mixtures thereof.

9. The method of claim 7 wherein the organic solvent comprises a mixture of tetrahydrofuran and N-methyl pyrrolidone.

10. The method of claim 7 wherein the cathode comprises 80 to 92 weight % $MnO_2$ and 6 to 10 weight % elemental carbon.

11. A method of forming a battery comprising:
    forming a first electrode, the forming the first electrode comprising:
       forming an electrode material mixture, the electrode material mixture comprising an electrode active material, a conductive medium, and a binder material comprising copolymers of ethylene and propylene monomers;
       forming the electrode material mixture into a sheet;
       forming a powder from the sheet;
       compressing the powder into a disk having a thickness of less than or equal to about 12 mils and forming the first electrode from the disk providing a second electrode; and
    incorporating the first and second electrodes into a battery.

12. The method of claim 11 wherein the forming the electrode mixture into a sheet comprises solvent casting the electrode material with an organic solvent comprising methyl ethyl ketone, -methyl pyrrolidone, or mixtures thereof.

13. The method of claim 11 wherein the first electrode is a cathode and the second electrode is an anode.

14. The method of claim 11 wherein the first electrode is a cathode and the electrode active material comprises at least one of $MnO_2$ and $(CF)_x$.

15. The method of claim 11 wherein the first electrode is a cathode, the electrode active material comprises $MnO_2$, and the conductive medium comprises elemental carbon.

16. The method of claim 15 wherein the the cathode comprises 2 to 10 weight % copolymers of ethylene and propylene monomers, 80 to 92 weight % $MnO_2$, and 6 to 10 weight % elemental carbon.

17. The method of claim 11 wherein the cathode exhibits a discharge rate of about 2 milliamps/cm$^2$.

18. A method of forming a battery comprising:
    forming a first electrode, the forming the first electrode comprising:
       forming a liquid electrode material mixture, the electrode material mixture comprising an electrode active material, a conductive medium, and a binder material comprising copolymers of ethylene and propylene monomers;
       solidifying the electrode material mixture;
       forming a powder from the solidified electrode material mixture; and
       compressing the powder to form an electrode pellet having a thickness of less than or equal to about 12 mils;
    providing a second electrode; and
    incorporating the first and second electrodes into a battery.

19. The method of claim 18 wherein the first electrode is a cathode and the second electrode is an anode.

20. The method of claim 18 wherein the first electrode is a cathode and the electrode active material comprises at least one of $MnO_2$ and $(CF)_x$.

21. The method of claim 18 wherein the first electrode is a cathode, the electrode active material comprises $MnO_2$, and the conductive medium comprises elemental carbon.

* * * * *